United States Patent [19]

Roberts

[11] 4,108,813
[45] Aug. 22, 1978

[54] CEMENTITIOUS FLOORING COMPOSITION CONTAINING MIXTURE OF INTERMESHING PARTICLES OF SUBSTANTIALLY SPHERICAL QUARTZ SAND

[76] Inventor: Albert Lee Roberts, 4309 Paseo De Las Tortugas, Torrance, Calif. 90505

[21] Appl. No.: 425,274

[22] Filed: Dec. 17, 1973

[51] Int. Cl.$^2$ .............................................. C08L 31/02
[52] U.S. Cl. ...................... 260/29.6 S; 106/92; 106/95; 260/13; 260/17 R; 260/22 CB; 260/22 R; 260/22 A; 260/29.4 R; 260/29.7 S
[58] Field of Search ...................................... 260/29.6 S

[56] References Cited

U.S. PATENT DOCUMENTS

| | | | |
|---|---|---|---|
| 2,311,233 | 2/1943 | Jaenicke et al. | 260/29.6 S |
| 3,196,122 | 7/1965 | Evans | 260/29.6 S |
| 3,382,139 | 5/1968 | Popkin et al. | 260/29.6 S |
| 3,547,853 | 12/1970 | Kalandiak | 260/29.6 S |

FOREIGN PATENT DOCUMENTS 79,965  12/1971  German Democratic Rep.
80,654  12/1971  German Democratic Rep.

OTHER PUBLICATIONS

Cols. 35-36 of USP 3306875.

*Primary Examiner*—Harold D. Anderson
*Attorney, Agent, or Firm*—Thomas H. Jones

[57] ABSTRACT

A cementitious composition suitable for spray application in formation of a dense floor structure. The composition has a Brookfield viscosity of about 2,000 to about 5,000 centipoises (cps) as measured at 20 rpm with a number 3 spindle and contains about 58 to about 70 percent by weight of a mixture of intermeshing particles of substantially spherical quartz sand. The intermeshing particles of substantially spherical quartz sand are composed of a weight fraction of relatively large size particles and a weight fraction of relatively small size particles with the weight ratio of the larger particles to the smaller particles ranging from about 3:1 to about 1:1 and an average diameter ratio of the larger particles with respect to the smaller particles ranging from about 2:1 to about 3:1. Additionally, the composition has a low water-to-cement ratio of about 0.4 to about 0.5 and contains a plastic-in-water emulsion composed of minute spherical plastic particles which intermesh with the particles of substantially spherical quartz to provide a dense floor structure having a low content of voids. The emulsion has a solids content of about 20 percent to about 50 percent by weight and, in addition, the composition contains a flow control material such as a high molecular weight poly(ethylene oxide) and optionally a gel retarder. The flow control material is present in an amount sufficient to provide the composition with laminar flow properties during spraying while the gel retarder may be present in an amount sufficient to provide a gel time between about 1 hour and about 6 hours.

A method for forming a relatively dense cementitious floor structure which has a relatively low percentage of voids and very little shrinkage during curing, which comprises spraying the above described composition through a nozzle onto a generally horizontal supporting surface.

20 Claims, No Drawings

CEMENTITIOUS FLOORING COMPOSITION CONTAINING MIXTURE OF INTERMESHING PARTICLES OF SUBSTANTIALLY SPHERICAL QUARTZ SAND

In the formation of a cementitious floor structure, the quantity of water present in the cementitious composition is of considerable importance in determining the final properties of the floor structure. It is generally known that the quantity of water in the cementitious composition should be kept to a minimum since the evaporation of excess water during cure of the cement can cause crazing with the formation of surface cracks. Also, the presence of excess water can produce voids within the cured structure which reduces its strength.

Even though it is known to be desirable to reduce the quantity of water in a cementitious composition to a minimum, there has been no practical way to accomplish this and, at the same time, to have a composition with good application properties such that it can be applied by spraying. The minimum amount of water required for setting of the cementitious composition is the quantity of water that is taken up in hydration of the calcium silicate compounds present in the cement. However, when the amount of water is reduced to the minimum amount required for hydration, the cementitious composition is then so thick that it has poor application properties and can only be applied by extensive troweling and handworking.

When the quantity of water present in the cementitious composition is increased above the minimum amount required for hydration, the application properties of the composition are improved such that it may then be made pourable and sprayable through proper adjustment of the water content. However, in achieving the desired application properties, the excess water in the cement may produce voids in the cured cementitious structure and may also produce crazing.

In providing a solution to the aforementioned problems, it would be desirable to have a cementitious composition that would be suitable for the formation of a dense floor structure and which could also be applied easily through a technique such as spraying but which would contain a minimum amount of water and would produce a dense cured floor structure having a low void content. Such a composition would provide an improved floor structure which cannot presently be obtained by an application procedure such as spraying. Also, such a composition would provide a floor structure which is free from surface cracking or crazing that may result from the presence of excess water.

In providing a solution to the aforementioned problems, the present composition has good application properties with a Brookfield viscosity of about 2,000 to about 5,000 cps, and preferably about 2,000 or less to about 3,000 cps as measured at 20 rpm with a Brookfield Synchroelectric Viscometer, Model LVF, using a number 3 spindle and may be applied to a generally horizontal support surface in forming a cementitious floor through the use of time-saving application procedures such as spraying. Also, however, the compositions of the invention have very low water-to-cement ratios and produce a cured floor structure that is relatively free from voids and free from the presence of surface cracking or crazing that results from the presence of excess water.

The principal ingredient in the present composition is a mixture of intermeshing particles of substantially spherical quartz sand in an amount of about 58 to about 70 percent by weight of the composition. Preferably, the mixture of quartz sand is composed of a weight fraction of relatively large particles and a weight fraction of relatively small particles with the weight ratio of larger particles to smaller particles ranging from about 3:1 to about 1:1 and the ratio of the average diameter of the larger particles with respect to the average diameter of the smaller particles ranging from about 2:1 to about 3:1.

During formation of a cementitious floor, it is desirable that the composition be relatively self-leveling so that the composition flows to some extent after application to a generally horizontal support surface. The generally spherical quartz sand particles having a larger average particle size produce good flow and leveling properties in the composition. However, if the generally spherical quartz sand was composed only of the larger size particles, the resulting structure would contain a higher quantity of voids and would not have the desired strength and density. Thus, the presence of the generally spherical quartz particles having a smaller average particle size is necessary to fill the interstices between the quartz particles of larger diameter when the larger diameter particles are in close contacting relationship. The resulting floor structure, thus, has the desired density and strength and yet has the desired flow and leveling properties provided by the larger particles.

As the average particle size of the fraction of larger quartz particles is increased, the larger particles become visible to the naked eye. Also, when the average particle size of the larger quartz particles is increased, the cementitious composition may become more difficult to spray.

When the average particle size of the smaller quartz particles is decreased, the water demand of the cementitious composition may increase which will cause a reduction in the strength of the resulting floor structure. Also, the viscosity of the cementitious composition may increase which will make the composition more difficult to apply through an application procedure such as spraying.

By employing a mixture of intermeshing substantially spherical quartz particles, the smaller sized quartz particles intermesh with the larger sized quartz particles to reduce the void space and to provide a more dense floor structure. This reduces the water demand of the cementitious composition since the amount of cement required to bond the spherical quartz particles together is reduced and less water is required to hydrate the cement. Preferably, the larger sized quartz particles have an average particle size which does not exceed about 20 mesh while the smaller sized particles have an average particle size which is not smaller than about 87 mesh (U.S. Standard Sieve Series). Most preferably, the larger sized particles have an average particle size of about 27 mesh and the smaller sized particles have an average particle size of about 87 mesh. While the concentration of the substantially spherical quartz sand may be varied, the most preferred concentration is about 63 to 65 percent with about 45 to 48 percent by weight of the larger sized particles and about 15 to 19 percent by weight of the smaller sized particles.

In addition to the quartz sand, the composition contains a plastic-in-water emulsion in which the plastic is present as minute spherical particles having a particle size of about 0.05 to about 50 microns and preferably about 0.1 to about 10 microns. The plastic in the emulsion may be any of the known materials used in plastic-in-water emulsions which is a film former and is capable of forming a tacky film at ambient temperatures through coalesence of the minute plastic spherical particles. Additionally, the plastic is a material which will bond to the substantially spherical quartz sand.

As examples of the various plastic-in-water emulsions which may be employed in the present composition, there are the acrylics in which the plastic is a polymer based on an ester of an acrylic acid, e.g., methyl methacrylate, ethylhexylacrylate, or a copolymer of acrylonitrile and butadiene, etc.; alkyds which comprise an oil-modified polyester resin formed from reaction of a polybasic acid such as phthalic anhydride, maleic anhydride, etc., with a polyhydric alcohol such as glycerine, pentaerythritol, etc., and the fatty acids of soya, linseed, dehydrated castor oil, etc., and optionally containing a material such as polyethylene glycol to provide improved water dispersibility; amino resins such as urea-formaldehyde, melamine-formaldehyde and the like which may be used in combination with alkyds, epoxies, etc., and bituminous coatings such as petroleum and natural asphalts, coal tar and pitch products.

Still further examples of plastics for plastic-in-water emulsions are the cellulosics such as nitrocellulose, ethyl cellulose and cellulose butyrate; drying oils which are triglycerides of long chain fatty acids with small amounts of phosphatides, carbohydrates and other impurities, e.g., linseed oil, tung oil, safflower oil, etc., which may be combined with resins such as phenolics, maleics, etc.; epoxies which are condensation products of epichlorohydrin and bisphenol or their derivatives; fluorocarbons; hydrocarbon resins such as terpene resins, coumaroneindene resins, petroleum resins, etc.; phenolics; polyamides; polyethylenes; rubbers such as chlorinated rubber, polychloroprene, polysulfides, etc.; styrene, and vinyl resins such as polyvinyl acetate, polyvinyl chloride and polyvinyl butyrals.

Plastic-in-water emulsions of various types, as listed above, are well known and any of the various plastic-in-water emulsions may be used in the present composition although the acrylic emulsions are preferred. However, as stated, the plastic in the emulsion must be present in the form of minute spheres and the plastic must be capable of forming a tacky film at ambient temperatures and of bonding to the spherical quartz particles and other solid materials in the composition.

While not being bound by any theory, it is believed that the form of the plastic material in the emulsion as minute spherical particles is of considerable importance in the functioning of my composition. The spherical form of the minute plastic particles is believed to enhance the desired flow properties of the composition which permit its application through spraying. Additionally, the spherical form of the plastic particles and their minute size provides intermeshing of the plastic particles with the mixture of intermeshing quartz particles such that the plastic particles fill in the interstices between the spherical quartz sand particles to provide a structure having improved bond strength, flexibility, chemical inertness, resistance to attack by acids, freeze-thaw stability, and waterproof characteristics.

In general, the solids content of the emulsion may range from about 20 to about 50 percent by weight of the emulsion. Preferably, however, the solids content is about 32 to 40 percent by weight and most preferably about 35 percent by weight of the emulsion.

In addition to the substantially spherical quartz sand and the plastic-in-water emulsion, there is also present a finely ground Portland cement which is composed principally of calcium silicates such as dicalcium silicate, tricalcium silicate, and calcium aluminum silicate. Portland cement is available in various grades which are denoted Grades I-IV. Portland cements may be graded, for example, on the basis of their tolerance to high concentrations of sulfate ions, their rate of gel time, their suitability for application in cold climates, and the time required to achieve high strength. While various Portland cements may be used in the present compositions, the use of a white general purpose Portland cement is preferred since the cementitious composition can then be suitably colored by adding a small quantity of a pigment which is unreactive with water such as iron oxide, chromium oxide or titanium dioxide.

As stated, the water/cement ratio in the present cementitious compositions is between about 0.4 to about 0.5 and is preferably about 0.45 to 0.47. Also, the content of Portland cement is preferably about 20 to about 23 percent by weight. In general, the water which is present in the compositions is supplied entirely by the water in the emulsion. Thus, in formulating the cementitious compositions, it is not necessary to add additional water.

In addition to the foregoing ingredients, there is also present a flow control material, such as a high molecular weight polyethylene oxide or a water soluble gum. The function of the flow control material is to give the cementitious composition laminar flow properties such that it can be suitably pumped through conventional spray equipment of the type used for the application of stucco. Such spray equipment, as exemplified by Durasurf Pump and Spray Machine, Model D-101, sold by Durasurf Corporation, a Division of Bruner Pacific Marble and Granite, Inc., Pico Rivera, California, functions by conveying the cementitious composition to a spray nozzle supplied with air with the air flow rate being sufficient to break up the composition into small blobs which are blown against a support surface.

Flow control materials are, in general, high molecular weight, long chain, water soluble polymers. Examples of flow control materials are carboxymethyl cellulose, irish moss extract, guar gum, polyacrylamide, and poly(ethylene oxide) resins. During flow, the long chains of the flow control material tend to line up with each other and to resist a change in the flow pattern which would disturb this alignment. In this manner, the presence of the flow control material assists in maintaining laminar flow by resisting a turbulent flow pattern which would disturb the alignment of the long chain molecules of the flow control material.

Polyacrylic latices which have been found satisfactory as a plastic-in-water emulsion for use in the present compositions may be obtained from the Rohm and Haas Company, Philadelphia, Pennsylvania under the trademark Rhoplex. As an example, a polyacrylic emulsion denoted Rhoplex MC-76 or E-764 may be obtained as a milky white opaque dispersion having a solids content of 47 ± 1.0 percent, a pH of 9.4 to 9.9, a specific gravity of 1.054 and a density of 8.8 pounds per gallon.

In the use of high molecular weight poly(ethylene oxide) as the flow control agent, preferably having a molecular weight in the order of 3,000,000 to about 6,000,000, the poly(ethylene oxide) may, for example, be present at a concentration range of about 0.0005 to about 0.004 percent by weight of the overall composition. A preferred concentration is about 0.001 to about 0.002 percent by weight and the most preferred concentration is about 0.0016 to about 0.0017 percent by weight. High molecular weight poly(ethylene oxide) is available from Union Carbide Corporation, Chemicals and Plastics Development Division, 270 Park Avenue, New York, New York, 10017, under the trademark Polyox.

A further ingredient which may be present in the compositions is a gel retarder which may be present in an amount sufficient to provide a gel time for the composition of between about 1 and about 6 hours. Additionally, the gel retarder functions to decrease the gel size and to reduce the water demands of the composition.

Gel retarders are known materials and, in general, may contain a metallic salt of a hydroxylated carboxylic acid as the active ingredient. As an example, a suitable gel retarder is obtainable from Sika Chemical Corporation under the trademark Plastiment Concrete Densifier. If present, the content of the gel retarder generally ranges from about 0.02 to about 0.06 and preferably about 0.03 to about 0.05 percent by weight of the composition. However, since the affect of the gel retarder may vary depending on the particular Portland cement in the composition, the content of the gel retarder may be varied or in some cases eliminated to suit the particular Portland cement in providing a gel time of about 1 to about 6 hours while reducing the gel size so as to reduce shrinkage of the composition through evaporation of water after gellation has occurred.

Optionally, the composition may also contain a minor amount of a gel accelerator such as calcium chloride or sodium hydroxide. Such a material may be employed, for example, if the effect of the gel retarder is too pronounced for a particular Portland cement with the result that the composition would have an excessive gel time in the absence of a gel accelerator.

To further illustrate the invention, there is presented the following example in which all parts and percentages are by weight unless otherwise indicated.

EXAMPLE

A dry mixture was formed by admixing 46.8 parts of a near spherical quartz sand having an average particle size of 27 mesh, 17.0 parts of a near spherical quartz sand having an average particle size of 87 mesh (U.S. Standard Sieve Series) and 21.2 parts of a finely divided white general purpose Portland cement. The 27 mesh sand was Ottawa Flint Shot from Ottawa, Illinois, the 87 mesh sand was Oklahoma No. 1, obtained from Pennsylvania Glass Sand Company, and the white Portland cement was obtained from Riverside Cement Company, Riverside, California. A liquid mixture was also made up by admixing 14.9534 parts of a plastic-in-water emulsion (Rhoplex emulsion MC-76) diluted with water to a solids content of 35 percent, with 0.0450 parts of a gel retarder (Plastiment Concrete Densifier from Sika Chemical Corporation) and 0.0016 parts of a high molecular weight poly (ethylene oxide) flow control material (Polyox FRA from Union Carbide Corporation). The liquid mixture was then added to a mixing vessel and the dry mixture was added slowly to the vessel. After mixing for about two minutes, the dry mixture and liquid mixture were blended to substantial homogeneity and the resulting mixture was in condition for spray application to a generally horizontal supporting surface in forming a dense floor structure.

Before applying the cementitious composition to a support surface, the support surface is preferably primed with a plastic-in-water emulsion, as described previously, and the emulsion is allowed to dry for about 10 minutes or more. This insures a better bond between the cementitious composition and the support surface.

In the foregoing description and example, reference has been made to average particle size in describing the mixture of intermeshing substantially spherical quartz particles. The average particle size is used in industry in referring to material which passes through a commercial screen having a specified number of mesh openings per inch. Due to the manner in which commercial screening is conducted, the particles passing through a commercial screen having a specified number of mesh per inch will not be uniformly sized to the degree that is obtained in laboratory screening. Thus, the particles passing through a commercial screen have a particle size distribution which is typical of materials that are commercially screened through a screen having the specified number of mesh per inch.

By way of example, a typical screen analysis for substantially spherical quartz particles (Oklahoma No. 1 quartz sand) having an average particle size of 87 mesh is as follows:

Retained on 40 mesh; 0.10%
Retained on 50 mesh; 1.30%
Retained on 70 mesh; 12.80%
Retained on 100 mesh 40.10%
Retained on 140 mesh; 35.30%
Retained on 200 mesh 8.90%
thru 200 mesh; 1.50%

The above typical screen analysis for material having an average particle size of 87 mesh is obtained with laboratory screening equipment in which a weighed amount of material is placed on the uppermost screen in a series of stacked laboratory screens (U.S. Standard Sieve Series). On shaking the screens, the material on the uppermost screen then progressively moves through the series of screens with a certain percentage of the material being retained on each of the screens. After shaking the stacked screens for an extended time period, the screens are then separated and the material on each of the screens is weighed to determine the percentage of material retained on the particular screen.

A typical screen analysis for substantially spherical quartz particles (Ottawa Flint Shot) having an average particle size of 27 mesh is obtained in a similar manner to that described above. The typical screen analysis (U.S. Standard Sieve Series) for this material was as follows:

Retained on 30 mesh; 30%
Retained on 40 mesh; 60%
thru 40 mesh; 10%

The present compositions may be used in various manners in constructing the dense floor structure. As described, the material may simply be sprayed onto a substantially horizontal supporting surface, generally to a depth of about 3/16 to about ½ inches. On contact of the composition with the surface, the viscosity characteristics of the composition are such that air which is retained within the composition is expelled. Also, the composition is sufficiently fluid so that flow and leveling takes place to provide a substantially smooth surface.

A further use for the present compositions is in forming terrazo floors in which marble chunks are bonded together by the cementitious material with the surfaces of the marble chunks being exposed to produce an attractive appearance. Previously, the formation of a terrazo floor has been a very time-consuming operation in which a mixture of marble chunks and cementitious material was first formed and then poured onto the substantially horizontal supporting surface. After this, the material is extensively worked, e.g., trowelled and rolled, to level and densify the floor and then seeded with additional marble chips and again rolled, etc. After partial curing of the cementitious material, the surface is then ground in a rough grinding operation which, in addition to exposing the surface of the marble chips, may also produce some chipping of the cementitious material at its point of contact with the marble chips. After the rough grinding operation, it was then necessary to fill in imperfections or voids in the surface of the cementitious material with grouting and to then finish the floor preparation with a fine grind of the entire surface.

Through use of the present compositions, the formation of a terrazo floor is greatly simplified. The first operation is generally to sprinkle a few marble chips of a desired height, such as number 2 chips, over the substantialy horizontal supporting surface. These chips act as height gauges for the next operation which is spraying a composition of the present invention onto the supporting surface until the height of the marble chips is reached. Following this, the surface is then seeded with additional marble chips such as number 1 or number 2 chips and the surface is rolled (very little working is required in comparison with conventional operations). After partial cure of the cementitious composition, the surface is then ground.

Through use of the present compositions as the cementitious material in forming a terrazo floor, the time required for formation is greatly reduced. Also, the improved strength and density of the cementitious material provides a superior terrazo floor and substantially eliminates the need for grouting. In a terrazo floor formed through use of one of the present compositions, the cementitious material which interconnects the marble chunks is not chipped or cracked as easily. Also, the marble chunks are more firmly embedded in the cementitious material and, thus, there is less tendency for the marble chunks to pop out.

When using a cementitious composition of the invention in forming a terrazo floor, the grinding operation can be performed within about 20 hours after formation of the floor. Prior to grinding, the cementitious material must develop sufficient bond strength to form a secure bond with the marble chunks embedded therein. Otherwise, the force of the grinding operation will dislodge the chunks from the cementitious material. The necessary bond strength for grinding is provided by a cementitious material of the invention within about 20 hours. However, in forming a terrazo floor using a cementitious material of the prior art, from four to seven days are required before the grinding operation can be performed. Thus, the use of the present cementitious materials in forming a terrazo floor has made it possible to reduce the overall time to about one quarter of that which was previously required. Also, use of the present compositions greatly reduces the amount of working required and, in addition, permits application of the cementitious material by spraying. This provides a great reduction in the labor costs in installation of the terrazo floor.

Also, due to the higher strength provided by a cementitious material of the invention in forming a terrazo floor, the cementitious material may be laid down in a thinner layer while still providing the necessary strength for bonding the marble chunks. This produces a saving in material which permits a reduction in the cost of the terrazo floor. Also, the use of a thinner layer of cementitious material provides a weight savings which is of considerable importance in constructing a large building where the size and strength of the structural members in the building is directly related to the building weight.

In a further application technique, the present compositions may be used in forming a multi-colored floor. In using this technique, the cementitious composition may first be applied through a spray nozzle onto a substantially horizontal supporting surface to create a moonscape or cratered surface. This is done by adjusting the spray nozzle so that the composition is applied in the form of larger blobs which form minute craters in the exposed floor surface. After forming the moonscape surface, the surface is then ground lightly with a disc sander or similar device and a grouting of the cementitious material is applied in any convenient manner, such as by use of a squeegee. The grouting has a color which contrasts with the color of the floor surface and due to the depressions in the moonscape surface, the grouting is deposited only in the depressions in the floor surface. On curing, the floor, thus, has a multi-colored appearance.

As demonstrated in the foregoing specification, the present compositions have good application properties and may be applied to a substantially horizontal surface through time-saving procedures such as spraying. The compositions have good adherence to various materials such as wood, metal or concrete which may form the substantially horizontal support surface.

In addition to having good application properties, the present compositions have low water/cement ratios and produce a floor structure which is extremely hard and abrasion resistant in comparison to concrete. The resulting floor structure is also relatively free from voids and crazing and is quite dense in comparison to concrete. These properties provide a floor structure which is relatively non-porous and which is easily cleaned. In addition, the resulting floor structure has improved strength, is more chemically inert and is more resistant to attack by acids such as fatty acids used in food processing operations, has improved freeze-thaw stability and has improved water-proof characteristics.

I claim:

1. A cementitious composition suitable for spray application in the formation of a dense floor structure, said composition consisting essentially of:
about 58 to about 70 percent by weight of a mixture of intermeshing particles of substantially spherical quartz sand;
said mixture including a weight fraction of relatively large size particles and a weight fraction of relatively small size particles;
the weight ratio of the relatively large size particles with respect to the relatively small size particles ranging from about 3:1 to about 1:1 and the ratio of the average diameter of the relatively large size particles with respect to the average diameter of the relatively small size particles ranging from about 2:1 to about 3:1;

a finely ground Portland cement;

a plastic-in-water emulsion having a solids content of about 20 to about 50 percent by weight of the emulsion;

the plastic in sand emulsion being an acrylic plastic which is present in the form of minute spherical particles having a particle size of about 0.05 to about 50 microns and said plastic being capable of forming a tacky film at ambient temperatures and bonding to the substantially spherical quartz sand;

a flow control material in an amount sufficient to provide the composition with laminar flow properties during spray application;

said composition having a low water-to-cement ratio in the range of about 0.4 to about 0.5, with the water being furnished by said emulsion and said composition having a Brookfield viscosity of about 2,000 to about 5,000 centipoisers as measured at 20 rpm with a Brookfield Synchroelectric Viscometer, Model LVF, using a number 3 spindle, whereby said composition may be sprayed onto a generally horizontal support surface in the formation of a dense floor structure having a low void content and being substantially free from surface cracking or crazing and with the composition being sufficiently fluid to provide flow and leveling after application to the support surface.

2. The composition of claim 1 wherein the quartz sand in the weight fraction of relatively large size particles has an average particle size which does not exceed about 20 mesh, and the quartz sand in the weight fraction of relatively small size particles has an average particle size which is not less than about 87 mesh.

3. The cementitious composition of claim 2 wherein said water-to-cement ratio is about 0.45 to about 0.47.

4. The composition of claim 2 including a small quantity of gel retarder in an amount sufficient to provide a gel time for said composition of about 1 to about 6 hours while decreasing the gel size of said composition.

5. The composition of claim 2 wherein the quartz sand in the weight fraction of relatively large size particles has an average particle size of about 27 mesh, and the quartz sand in the weight fraction of relatively small size particles has an average particle size of about 87 mesh.

6. The composition of claim 2 wherein said flow control material is a high molecular weight poly(ethylene oxide) resin.

7. The composition of claim 2 wherein said Portland cement is a general purpose Portland cement, and the content of said Portland cement is about 20 to about 23 percent by weight of the composition.

8. The composition of claim 1 wherein the acrylic plastic in said emulsion is present in the form of minute spherical particles having a particle size of about 0.1 to about 10 microns.

9. The composition of claim 8 wherein the solids content of said emulsion is about 32 to about 40 percent by weight of said emulsion.

10. The composition of claim 8 wherein the viscosity of said composition is about 2,000 to about 3,000 centipoises as measured at 20 rpm with a Brookfield Synchroelectric Viscometer, Model LVF, using a number 3 spindle.

11. The composition of claim 2 wherein said mixture of substantially spherical quartz sand is present in an amount of about 63 to about 65 percent by weight of the composition.

12. The composition of claim 5 wherein said mixture of substantially spherical quartz sand is present in an amount of about 63 to about 65 percent by weight of the composition.

13. The composition of claim 12 wherein the quartz sand in the weight fraction of relatively large size particles is present in an amount of about 45 to about 48 percent, and the quartz sand in the weight fraction of relatively small size particles is present in an amount of about 15 to about 19 percent by weight.

14. A cementitious composition suitable for spray application in the formation of a dense floor structure, said composition consisting essentially of:

about 63 to about 65 percent by weight of a mixture of intermeshing particles of substantially spherical quartz sand;

said mixture including a weight fraction of relatively large size particles and a weight fraction of relatively small size particles;

the quartz sand in the weight fraction of relatively large size particles having an average particle size of about 27 mesh and being present in an amount of about 45 to about 48 percent;

the quartz sand in the weight fraction of relatively small size particles having an average particle size of about 87 mesh and being present in an amount of about 15 to about 19 percent;

a finely divided Portland cement;

a plastic-in-water emulsion having a solids content of about 32 to about 40 percent by weight;

said plastic being present in the emulsion in the form of minute spheres having a particle size of about 0.1 to about 10 microns;

said plastic being an acrylic plastic which is capable of forming a tacky film at ambient temperatures in bonding to the intermeshing particles of substantially spherical quartz sand through coalescence of the minute plastic spherical particles;

a poly(ethylene oxide) flow control material at a concentration of about 0.001 to about 0.002 percent by weight sufficient to provide the composition with laminar flow characteristics during spray application;

said composition having a water-to-cement ratio in the range of about 0.45 to about 0.47, with the water being furnished by said emulsion and said composition having a Brookfield viscosity of about 2,000 to about 3,000 centipoises as measured at 20 rpm with a Brookfield Synchroelectric Viscometer, Model LVF, using a number 3 spindle, whereby said composition may be sprayed onto a generally horizontal support surface in the formation of a dense floor structure having a low void content and being substantially free from surface cracking or crazing and with the composition being sufficiently fluid to provide flow and leveling after application to the support surface.

15. The composition of claim 14 including a gel retarder in an amount sufficient to provide a gel time of about 1 to about 6 hours while decreasing the gel size of the composition.

16. The composition of claim 15 wherein said gel retarder is present at a concentration of about 0.02 to about 0.06 percent by weight.

17. The composition of claim 15 wherein said gel retarder is present at a concentration of about 0.03 to about 0.05 percent by weight.

18. The composition of claim 14 wherein
said Portland cement is a general purpose Portland cement, and
the content of said Portland cement is about 20 to about 23 percent by weight of the composition.

19. The composition of claim 17 wherein
said Portland cement is a general purpose Portland cement, and
the content of said Portland cement is about 20 to about 23 percent by weight of the composition.

20. The composition of claim 19 wherein the solids content of said plastic-in-water emulsion is about 35 percent by weight of the emulsion.

* * * * *